United States Patent
Bertsch

(10) Patent No.: US 11,635,017 B2
(45) Date of Patent: Apr. 25, 2023

(54) PRE-CHAMBER SPARK PLUG FOR A COMBUSTION CHAMBER OF AN INTERNAL COMBUSTION ENGINE, IN PARTICULAR OF A MOTOR VEHICLE, AND AN INTERNAL COMBUSTION ENGINE FOR A MOTOR VEHICLE

(71) Applicant: Daimler AG, Stuttgart (DE)

(72) Inventor: Dietmar Bertsch, Aspach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/769,495

(22) PCT Filed: Nov. 28, 2018

(86) PCT No.: PCT/EP2018/082765
§ 371 (c)(1),
(2) Date: Jun. 3, 2020

(87) PCT Pub. No.: WO2019/110381
PCT Pub. Date: Jun. 13, 2019

(65) Prior Publication Data
US 2020/0386147 A1    Dec. 10, 2020

(30) Foreign Application Priority Data
Dec. 5, 2017   (DE) .................. 10 2017 011 209.6

(51) Int. Cl.
*F02B 19/18* (2006.01)
*F02B 19/12* (2006.01)
(Continued)

(52) U.S. Cl.
CPC .............. *F02B 19/18* (2013.01); *F02B 19/12* (2013.01); *H01T 13/39* (2013.01); *H01T 13/467* (2013.01); *H01T 13/54* (2013.01)

(58) Field of Classification Search
CPC .......... F02B 19/12; F02B 19/18; H01T 13/39; H01T 13/467; H01T 13/54
(Continued)

(56) References Cited

U.S. PATENT DOCUMENTS 1,188,529 A * 6/1916 Baysdorfer ........... H01T 13/467
313/140
3,719,861 A    3/1973 Burley
(Continued)

FOREIGN PATENT DOCUMENTS

CN           2825995 Y      10/2006
DE    10 2005 005 851 A1    8/2006
(Continued)

OTHER PUBLICATIONS

PCT/EP2018/082765, International Search Report dated Feb. 5, 2019 (Two (2) pages).
(Continued)

*Primary Examiner* — Logan M Kraft
*Assistant Examiner* — Joshua Campbell
(74) *Attorney, Agent, or Firm* — Crowell & Moring LLP

(57) ABSTRACT

A pre-chamber spark plug for a combustion chamber of an internal combustion engine has a pre-chamber which has a plurality of openings and which is fluidically connectable to the combustion chamber via the openings. Two spark gaps are arranged in the pre-chamber via which respective sparks can be formed. The spark gaps are arranged symmetrically distributed in the pre-chamber and a first of the spark gaps is arranged further outwards than the second spark gap along a direction extending perpendicularly to the longitudinal direction of the pre-chamber spark plug.

2 Claims, 1 Drawing Sheet

(51) Int. Cl.
  *H01T 13/39* (2006.01)
  *H01T 13/46* (2006.01)
  *H01T 13/54* (2006.01)

(58) Field of Classification Search
  USPC .......................................................... 313/141
  See application file for complete search history.

(56) References Cited

U.S. PATENT DOCUMENTS

| | | | | |
|---|---|---|---|---|
| 3,868,530 | A * | 2/1975 | Eaton | H01T 13/39 |
| | | | | 313/144 |
| 4,924,829 | A * | 5/1990 | Cheng | H01T 13/462 |
| | | | | 123/169 PA |
| 5,554,908 | A * | 9/1996 | Kuhnert | H01T 13/54 |
| | | | | 313/142 |
| 7,216,623 | B2 * | 5/2007 | Teraji | F02B 19/12 |
| | | | | 123/260 |
| 8,324,792 | B2 | 12/2012 | Maul et al. | |
| 2002/0180326 | A1 * | 12/2002 | Francesconi | H01T 13/54 |
| | | | | 313/140 |
| 2005/0211217 | A1 | 9/2005 | Boley et al. | |
| 2007/0169737 | A1 * | 7/2007 | Gong | H01T 13/467 |
| | | | | 123/637 |
| 2013/0206122 | A1 * | 8/2013 | Chiera | F02P 15/001 |
| | | | | 123/594 |
| 2015/0194793 | A1 | 7/2015 | Yamanaka | |
| 2017/0358906 | A1 * | 12/2017 | Kuhnert | H01T 13/54 |

FOREIGN PATENT DOCUMENTS

| | | |
|---|---|---|
| DE | 10 2010 010 109 A1 | 9/2011 |
| DE | 10 2015 204 814 B3 | 5/2016 |
| JP | 2009-36157 A | 2/2009 |
| JP | 2009036157 A * | 2/2009 |

OTHER PUBLICATIONS

German-language German Office Action issued in German application No. 10 2017 011 209.6 dated Jul. 27, 2018 (Five (5) pages).
Chinese Office Action issued in Chinese application No. 201880078706.6 dated Jul. 22, 2021, with partial English translation (Ten (10) pages).
English machine translation of JP 2009-36157 A, which was previously cited as reference B4 on Jun. 3, 2020 (Twelve (12) pages).
Chinese Office Action issued in Chinese application No. 201880078706.6 dated Jan. 6, 2021 (Three (3) pages).

\* cited by examiner

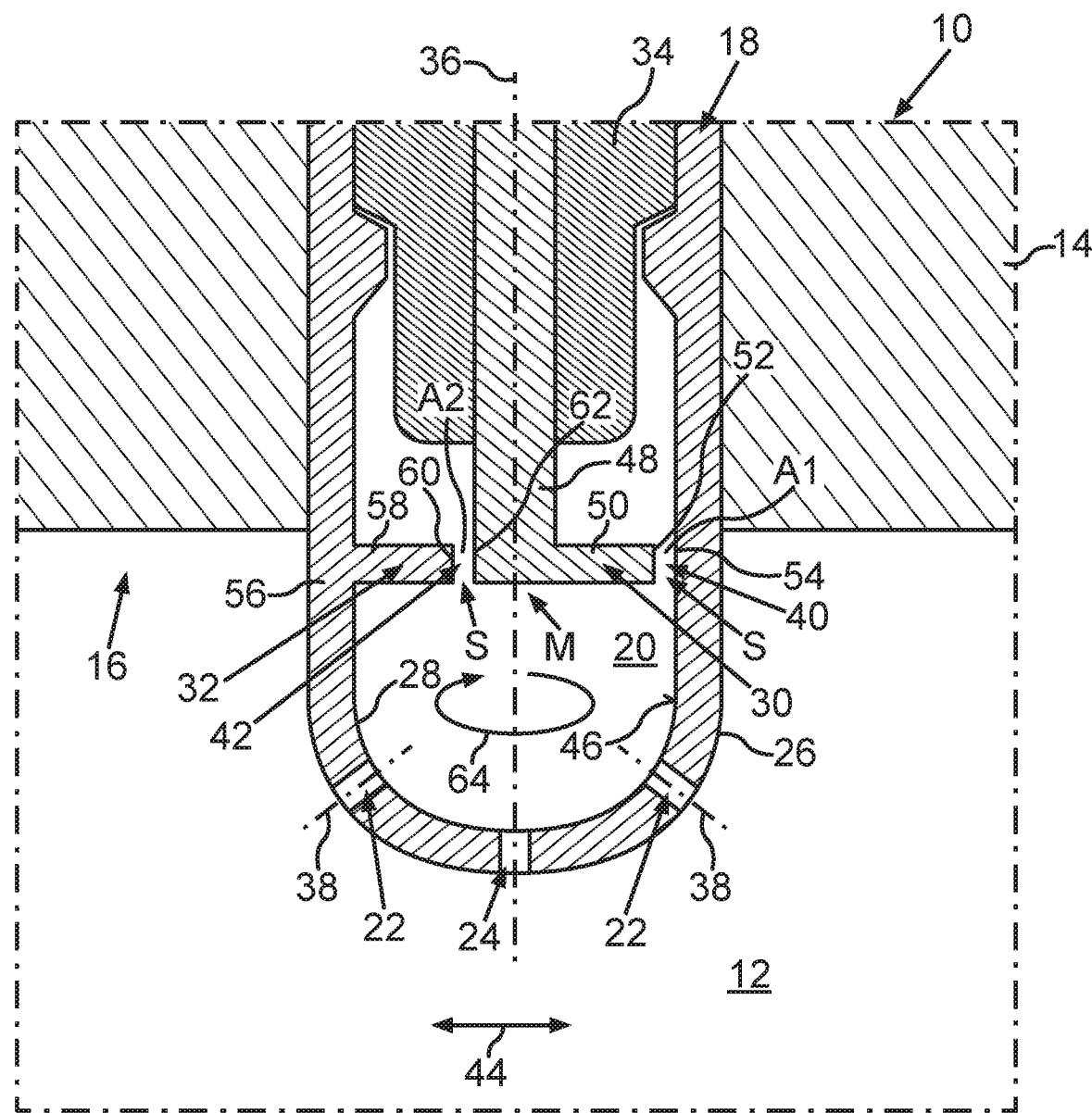

PRE-CHAMBER SPARK PLUG FOR A COMBUSTION CHAMBER OF AN INTERNAL COMBUSTION ENGINE, IN PARTICULAR OF A MOTOR VEHICLE, AND AN INTERNAL COMBUSTION ENGINE FOR A MOTOR VEHICLE

BACKGROUND AND SUMMARY OF THE INVENTION

The invention is based on a pre-chamber spark plug for a combustion chamber of an internal combustion engine, in particular of a motor vehicle. The invention is further based on an internal combustion engine for a motor vehicle.

Such a pre-chamber spark plug for a combustion chamber of an internal combustion engine, in particular of a motor vehicle, and such an internal combustion engine for a motor vehicle are already known, for example, from DE 10 2005 005 851 A1. In this case, the pre-chamber spark plug has a pre-chamber with several openings, wherein the pre-chamber can be fluidically connected or is connected to the combustion chamber via the openings. This allows, for example, a mixture comprising at least fuel and air to flow from the combustion chamber through the openings into the pre-chamber. The pre-chamber spark plug also has at least two spark gaps arranged in the pre-chamber, via which respective ignition sparks can be formed and thus generated. By means of the ignition sparks it is possible, for example, to ignite respective mixtures comprising at least fuel and air, which, for example, flow from the combustion chamber via the openings into the pre-chamber within respective operating cycles of the internal combustion engine, such that the mixture in the combustion chamber as a whole can be ignited by the respective ignition taking place in the pre-chamber.

Furthermore, DE 10 2010 010 109 A1 discloses a pre-chamber spark plug having a housing which has a pre-chamber having several openings at its front end.

U.S. Pat. No. 3,719,851 A1 discloses a spark plug having two spark gaps, wherein a first of the spark gaps is provided along a direction perpendicular to the longitudinal direction of the spark plug and a second spark gap is provided along the longitudinal direction.

DE 10 2015 204 814 B3 discloses a pre-chamber spark plug for a combustion chamber of an internal combustion engine having a pre-chamber having several openings and being fluidically connectable to the combustion chamber via the openings. Four spark gaps are arranged in the pre-chamber, via which respective ignition sparks can be formed. The four spark gaps are arranged symmetrically distributed in pairs in the pre-chamber.

The generic patent specification JP 2009-36 157 A discloses a pre-chamber spark plug for a combustion chamber of an internal combustion engine having a pre-chamber having several openings and being fluidically connectable to the combustion chamber via the openings. Several spark gaps are arranged in the pre-chamber, via which respective ignition sparks can be formed. The spark gaps are arranged symmetrically distributed in the pre-chamber along a direction perpendicular to a longitudinal direction of the pre-chamber spark plug.

The object of the present invention is to further develop a pre-chamber spark plug and an internal combustion engine of the type mentioned above in such a way that a particularly advantageous operation of the internal combustion engine can be achieved, in particular in different operating modes of the internal combustion engine.

In order to further develop a pre-chamber spark plug of the type specified herein in such a way that a particularly advantageous operation of the internal combustion engine can be implemented, in particular also with different operating modes of the internal combustion engine, it is provided in accordance with the invention that the spark gaps are arranged asymmetrically distributed in the pre-chamber. The invention is based on the knowledge that, in particular with different operating modes or operating states of the internal combustion engine, different conditions, in particular flow conditions, can occur in the pre-chamber, such that different ignition conditions can occur, in particular in the pre-chamber, in whose presence respective mixtures comprising at least fuel and air, which for example flow, in particular within respective working steps of the internal combustion engine, via the openings from the combustion chamber into the pre-chamber, can be ignited by means of the pre-chamber spark plug. According to the invention, these different flow conditions or ignition conditions are taken into account by the asymmetrically distributed arrangement of the spark gaps in the pre-chamber, such that reliable ignition or inflammation of the mixtures can be ensured even under different flow conditions and thus, for example, under different operating modes of the internal combustion engine.

The respective spark gap is also referred to as a spark region, for example, because at least one ignition spark is formed or can form along the spark gap and thus in the spark zone, in order to ignite the respective mixture in the pre-chamber. This causes the respective mixture to ignite in the pre-chamber first. The ignition causes the mixture to combust or begin to combust in the pre-chamber, such that burning flares enter the combustion chamber from the pre-chamber via the openings, such that the mixture in the combustion chamber is inflamed or ignited as a whole and subsequently combusted. Due to the asymmetrically distributed arrangement of the spark gaps in the pre-chamber, two different spark regions are implemented by means of the spark gaps, whereby inflammation conditions are improved in comparison to conventional pre-chamber spark plugs in which the spark gaps are symmetrically distributed in the pre-chamber.

It has proved to be particularly advantageous here if a first of the spark gaps is arranged further outwards than the second spark gap along a direction perpendicular to the longitudinal direction or longitudinal extension direction of the pre-chamber spark plug, such that the second spark gap is arranged closer to or in the middle of the pre-chamber spark plug than the first spark gap, for example. Since the first gap is arranged further outwards than the second spark gap along the direction running perpendicularly to the longitudinal direction, the first spark gap is thus arranged closer along the direction than the second spark gap to an edge of the pre-chamber, the edge of which is formed, for example, by a housing of the pre-chamber spark plug which at least partially, in particular at least predominantly or completely, delimits the pre-chamber, in particular by a wall of the housing. This embodiment is based on the following findings, in particular those obtained by tests: the pre-chamber is a space which is at least almost closed to the combustion chamber, in which, for example, at least one ceramic is arranged, by means of which, for example, the respective ignition spark is generated. Since the ceramic is arranged in the pre-chamber, fractures of the ceramic due to pressure waves in the combustion chamber caused by external ignition can be avoided. However, for an application of the pre-chamber spark plug in an internal combustion engine, which is designed as a gasoline or petrol engine, for example, and which is equipped with direct fuel injection in particular, a special design of the pre-chamber spark plug, in particular with regard to the openings also referred to as holes and their geometry, is advantageous in order to ensure a desired function of the pre-chamber spark plug, in particular in the entire characteristic diagram of the internal combustion engine. The desired function of the pre-chamber spark plug, also referred to as a pre-chamber sparking plug, is in particular to ensure stable ignition of the respective mixture in the combustion chamber over the entire characteristic diagram. Here, it is advantageous that fuel or a mixture comprising at least fuel and air is flushed through the openings for producing an ignitable mixture in the respective spark region, in particular at low loads of the internal combustion engine. For a stable mixing, a corresponding flow field should be generated in the pre-chamber, in particular in its interior.

By way of example, it is provided that the pre-chamber should already be flushed with a mixture comprising at least fuel and air or a fresh gas during the intake stroke of the combustion chamber, such that an ignitable fuel-air mixture is absorbed in the pre-chamber at the moment of ignition. For this purpose, for example during the intake stroke of the internal combustion engine, the fuel for operating the internal combustion engine is injected directly into the combustion chamber on the basis of a characteristic diagram by means of an injector assigned to the combustion chamber, such that a fuel-air mixture which is ignitable at least at the ignition time is flushed from the combustion chamber into the pre-chamber via the openings as early as during the intake stroke as a result of a pulse resulting from the injection and as a result of a flow in the combustion chamber.

In order to ignite the combustible fuel-air mixture, also simply referred to as a mixture, produced in the pre-chamber in the aforementioned manner, for example, it is advantageous if an advantageous or ideal average turbulence prevails in the respective spark gap at the time of ignition. Likewise, there should not be an excessively high residual gas content in the spark gap at the ignition point in order to ensure sufficient ignition capability of the mixture. At low loads and speeds or with high residual gas content, there is a high residual gas content and only low turbulence near or in the middle of the pre-chamber, or more residual gas and less turbulence than, for example, at the edge of the pre-chamber. Advantageously, an ignition point at which the mixture in the pre-chamber is ignited or can be ignited is then located in such a load range at the inner edge of the pre-chamber, where there is higher turbulence and less residual gas compared to the center. In the case of higher loads, however, the advantageous ignition location, also known as the spark location, is near or in the middle of the pre-chamber. Due to the spark gaps and their asymmetrically distributed arrangement in the pre-chamber, which is provided in accordance with the invention, the above-mentioned spark regions, which differ from one another, and thus different spark or ignition locations are created, wherein, in particular depending on the operating mode or operating state of the internal combustion engine, advantageous conditions prevail at one or the other ignition location in order to ignite the mixture in the pre-chamber.

In other words, due to their asymmetrically distributed arrangement, the spark gaps are located at those points or locations in the pre-chamber where, depending in particular on the operating mode or operating condition of the internal combustion engine, favorable ignition conditions prevail in order to ignite the mixture in the pre-chamber. By means of the pre-chamber spark plug in accordance with the invention, respective mixtures in the pre-chamber and thus in the combustion chamber as a whole can thereby be ensured in different operating modes or operating states of the internal combustion engine, which is operated, for example, in the operating modes with low filling and/or low pressure in the combustion chamber, low charge movement or with a high exhaust gas recirculation rate and/or with a high charge compound and charge stratification, for example with a combustion air ratio ($\lambda$) in a range from 1.0 to 2.2 inclusive.

If, for example, favorable ignition conditions prevail at the edge of the pre-chamber spark plug in a first operating mode or in a first operating state of the internal combustion engine, while unfavorable ignition conditions prevail in the region of the center of the pre-chamber spark plug, the mixture in the pre-chamber can be ignited by means of the first spark gap. If, for example, in a second operating mode or in a second operating state of the internal combustion engine, advantageous ignition conditions prevail in the region of the center, while unfavorable ignition conditions prevail in the pre-chamber at the edge, the mixture in the pre-chamber can be ignited advantageously by means of the second spark gap. In this way, the respective ignitions of the respective mixtures can be ensured in the entire characteristic diagram of the internal combustion engine even with different operating modes of the internal combustion engine, such that a particularly advantageous, efficient and low-emission as well as quiet operation of the internal combustion engine can be achieved.

A further embodiment is characterised by the fact that one of the spark gaps is formed between the first two electrode regions and the other spark gap is formed between two second electrode regions. The respective electrode region is formed, for example, by at least one electrode of the pre-chamber spark plug, by means of which the respective ignition spark can be generated. The first electrode regions are spaced apart from each other by a first distance, while the second electrode regions are spaced apart from each other by a second distance different from the first distance. The respective distances are greater than zero and different from each other, whereby potential different ignition conditions in the pre-chamber, which may occur, for example, in different operating modes of the internal combustion engine, can be taken into account particularly advantageously.

In this way, it has been found that safe ignitions and thus inflammations of the mixtures can be implemented in the entire characteristic diagram of the internal combustion engine, in particular if the distances differ from one another within a range of 0.05 millimeters to 0.3 millimeters inclusive, in particular in a range of 0.05 millimeters to 0.15 millimeters inclusive.

In order to be able to safely ignite the mixtures even under different operating modes and thus different flow or ignition conditions, it is provided in a further embodiment of the invention that at least respective tips of the electrode regions are formed from a precious metal. The respective electrode region can be formed by a respective electrode, for example. The respective electrode can be designed as a cylindrical pen or pin, wherein the pin can be made of a metal, in particular of a precious metal, for example. Furthermore, it is conceivable that the respective electrode has a base body which is provided, for example, with a tip of precious metal, wherein the tip of precious metal forms the respective tip of the respective electrode region.

In order to be able to implement particularly advantageous ignition conditions in the pre-chamber, it is provided in a further embodiment of the invention that the respective passage directions of at least two of the openings run at an angle to the longitudinal direction or longitudinal extension direction of the pre-chamber spark plug. As a result, by means of the at least two openings, for example, an at least substantially swirling flow of the respective mixture flowing from the combustion chamber into the pre-chamber via the at least two openings is caused or generated, wherein the swirling flow is also referred to as swirl flow. The swirl flow can, for example, generate advantageous turbulence in at least one of the spark regions, such that in the one spark region, the mixture can be ignited advantageously in the pre-chamber and via this in the entire combustion chamber.

In a particularly advantageous embodiment of the invention, at least a third of the openings are formed as a central opening, wherein the at least two openings are arranged around the central opening in the circumferential direction of the pre-chamber spark plug, in particular evenly distributed. By way of example, the central opening has a direction of passage which can run in particular parallel to the longitudinal direction of the pre-chamber spark plug or can coincide with the longitudinal direction of the pre-chamber spark plug. The respective passage direction of the respective opening is to be understood in particular to mean that the respective mixture from the combustion chamber can flow through the respective opening along the passage direction, such that the respective opening is continuous for the mixture along the respective passage direction. In particular, for example, the respective passage direction runs at least substantially perpendicular to a respective plane in which the respective opening is arranged or formed.

In order to further develop an internal combustion engine of the type indicated herein in such a way that a particularly advantageous operation of the internal combustion engine can be implemented, in particular with different operating modes or operating states of the internal combustion engine, it is provided according to the invention that the spark gaps are asymmetrically distributed in the pre-chamber. Advantages and advantageous designs of the pre-chamber spark plug according to the invention are to be regarded as advantages and advantageous designs of the internal combustion engine according to the invention and vice versa.

Due to the different operating modes of the internal combustion engine, it can be operated particularly efficiently and thus with low fuel consumption and low emissions. However, due to the different operating conditions, different flow and thus ignition conditions can occur in the pre-chamber. These different flow and ignition conditions in the pre-chamber are taken into account by the asymmetrically distributed arrangement of the spark gaps, such that, for example, if ignition of the respective mixture in the pre-chamber is not possible by means of one of the spark gaps due to the respective flow or ignition conditions, ignition of the respective mixture in the pre-chamber is always effected by means of the respective other spark gap and can thus be guaranteed.

Here, it has proved to be particularly advantageous if the internal combustion engine has at least a first operating state in which respective ignition sparks for igniting respective fuel-air mixtures received in the pre-chamber are formed via a first of the spark gaps, and no ignition sparks are formed via the second spark gap. Furthermore, the internal combustion engine according to the invention preferably has at least one second operating state in which respective ignition sparks for igniting respective fuel-air mixtures received in the pre-chamber form via the second spark gap, and no ignition sparks are formed via the first spark gap. In this way, low-consumption, low-emission and quiet operation of the internal combustion engine can be achieved, since the mixtures in the pre-chamber and thus in the combustion chamber can be safely ignited in the entire characteristic diagram, even under the various operating conditions.

It has proved to be particularly advantageous if the aforementioned injector, by means of which the fuel is introduced, in particular directly, into the combustion chamber, in particular injected, is designed as a piezo actuator or piezo nozzle, in particular as a piezo A nozzle, or as a multi-hole nozzle, in particular with variable hole geometry and/or variable pressure. One of the operating modes is, for example, a so-called catalyst heating mode, in the scope of which at least one exhaust gas after-treatment device of the internal combustion engine, which is designed for example, as a catalyst or comprises at least one catalyst, is heated in a targeted manner. Furthermore, at least one of the operating modes may be a cold start or a warm-up, i.e., a warm-up phase of the internal combustion engine, also referred to as the engine. In particular, the pre-chamber spark plug according to the invention enables reliable ignition of the mixtures even at high loads and speeds of the internal combustion engine.

Further advantages, features and details of the invention emerge from the following description of a preferred exemplary embodiment and by means of the drawing.

In the single FIGURE, the drawing shows a schematic and sectional side view of an internal combustion engine for a motor vehicle in accordance with the invention.

BRIEF DESCRIPTION OF THE DRAWINGS

In the single FIGURE, the drawing shows a schematic and sectional side view of an internal combustion engine for a motor vehicle in accordance with the invention.

DETAILED DESCRIPTION OF THE DRAWINGS

The single FIGURE shows a schematic and sectional side view of an internal combustion engine, designated as a whole as 10, for a motor vehicle, in particular for a motor vehicle such as a passenger car. The internal combustion engine 10 is designed as a reciprocating piston engine and has at least one output shaft designed as a crankshaft, for example, via which the internal combustion engine 10 can provide torques for driving the motor vehicle. In particular, the internal combustion engine 10 is designed as a petrol engine, which is also referred to as a gasoline engine. Furthermore, it is preferably provided that the internal combustion engine 10 is equipped with a direct fuel injection.

The internal combustion engine 10 comprises at least one combustion chamber 12, in particular designed as a cylinder, which is at least supplied with fuel and air during respective working cycles of the internal combustion engine 10. The fuel is preferably a liquid fuel which is introduced, in particular in liquid form, into the combustion chamber 12, in particular injected directly. As a result of the fact that the combustion chamber 12 is supplied with the fuel and air, a fuel-air mixture comprising at least the fuel and air, which is simply referred to as a mixture, is formed in the combustion chamber 12, in particular within the respective, consecutive working cycles of the internal combustion engine 10. The fuel is, for example, a petrol or gasoline fuel and is used for fired operation of the internal combustion engine 10. During fired operation, the respective mixtures are ignited and thus combusted, whereby the output shaft is driven.

By way of example, the combustion chamber 12 is at least partially, in particular at least predominantly, formed or delimited by an engine housing not recognizable in the FIGURE, wherein the engine housing is designed, for example, as a cylinder housing, in particular as a cylinder crankcase. A further housing element 14 is connected to the engine housing, for example, which forms a combustion chamber roof 16 of the combustion chamber 12, for example. The housing element 14 is designed in particular as a cylinder head.

The internal combustion engine 10 comprises at least one pre-chamber spark plug 18, which is assigned to the combustion chamber 12 and, for example, projects at least partially into the combustion chamber. The pre-chamber spark plug 18, for example, is held, in particular in a reversibly detachable manner, on the housing element 14. The pre-chamber spark plug 18 has a pre-chamber 20 having several openings 22 and 24, via which the pre-chamber 20 can be fluidically connected to the combustion chamber 12. The pre-chamber 20 is, in particular towards the combustion chamber 12, at least partially, in particular at least predominantly or completely, formed or delimited by a housing 26 of the pre-chamber spark plug 18, in particular by a wall 28 of the housing 26. The pre-chamber spark plug 18 further comprises a first electrode 30, which is also referred to as a center electrode, for example. Furthermore, the pre-chamber spark plug 18 comprises at least a second electrode 32, which is also referred to as a ground electrode. The electrode 30 is held at least indirectly, in particular via an insulator 34, on the housing 26 or connected to it. In the exemplary embodiment illustrated in the FIGURE, the second electrode 32 is formed by the housing 26 or is formed integrally with it, such that the housing 26 functions as the ground electrode.

The pre-chamber spark plug 18 has a longitudinal direction illustrated in the FIGURE by a dotted line 36, which is also referred to as the longitudinal direction of extension of the pre-chamber spark plug 18. The pre-chamber spark plug 18 thus has a longitudinal extension running along the longitudinal direction. Furthermore, it can be recognized particularly well from the FIGURE that the opening 24 is designed as a central opening and the openings 22 as secondary openings, which are arranged in the circumferential direction of the pre-chamber spark plug 18 around the central opening, in particular evenly distributed. In addition, the openings 22 have respective directions of passage, illustrated in the FIGURE by dotted lines 38, which run at an angle to the longitudinal direction of the pre-chamber spark plug 18 and run towards each other towards the pre-chamber 20. The opening 24 (central opening) also has a passage direction which coincides with the longitudinal direction. The respective mixture forming in combustion chamber 12 flows within the respective operating cycle from combustion chamber 12 via the openings 22 and 24 along the respective passage directions into the pre-chamber 20, such that within the respective operating cycle, a mixture comprising at least fuel and air also forms in the pre-chamber 20.

The pre-chamber spark plug 18 now also has at least two spark gaps 40 and 42 arranged in the pre-chamber 20, via which respective ignition sparks can be formed. By means of the respective ignition sparks that can be formed via the spark gaps 40 and 42, the respective mixtures received within the respective working cycles in the pre-chamber 20 can be ignited such that the respective mixture is combusted in the pre-chamber 20. This results in burning flares which flow out of the pre-chamber 20 through the openings 22 and 24 into the combustion chamber 12 and ignite the mixture received in the combustion chamber 12. As a result, the mixture absorbed in the combustion chamber 12 combusts, whereby the output shaft is driven.

In order to be able to implement a particularly advantageous operation of the internal combustion engine 10, in particular with different operating modes or operating states of the internal combustion engine 10, the spark gaps 40 and 42 are arranged symmetrically distributed in the pre-chamber 20. In the exemplary embodiment illustrated in the FIGURE, the spark gap 40 is arranged further towards the outside than the second spark gap 42 along a direction running perpendicular to the longitudinal direction of the pre-chamber spark plug 18 and illustrated in the FIGURE by a double arrow 44, such that the spark gap 40 is arranged along the direction closer to an edge 46 of the pre-chamber spark plug 18, formed for example by the wall 28, than the spark gap 42. This means that along the direction illustrated by the double arrow 44, the spark gap 42 is located closer to or in the middle of the pre-chamber 20 than the spark gap 40.

The asymmetrically distributed arrangement of the spark gaps 40 and 42 in the exemplary embodiment illustrated in the FIGURE is implemented in particular by the fact that the electrode 30 has a first sub-region 48 and a second sub-region 50 which is formed in particular in one piece with it and which, for example, in the form of an arm of the electrode 30, runs obliquely or perpendicularly to the longitudinal direction of the pre-chamber spark plug 18 and thus, for example, along the direction illustrated by the double arrow 44 away from the sub-region 48 in the direction of the wall 28 or the edge 46. The spark gap 40 is thus formed between a first electrode region 52 formed by the electrode 30, in particular by the partial region 50, and a second electrode region 54 formed by the housing 26, in particular by the wall 28, which are arranged at a first distance A1 from each other, for example.

The electrode 32 has, for example, a third sub-region 56 and a fourth sub-region 58, which, for example, as a second arm of the electrode 32, runs obliquely or, in the present case, perpendicular to the longitudinal direction of the pre-chamber spark plug 18 and thus along the direction illustrated by the double arrow 44 from the sub-region 56 towards the electrode 30, in particular towards the sub-region 48. The spark gap 42 is thereby formed between a third electrode region formed by the electrode 32, in particular by the arm (sub-region 58), and a fourth electrode region 62 formed by the electrode 30, in particular by the sub-region 48. It can be recognized from the FIGURE that, for example, the electrode region 60 is formed by the electrode 32 and thus, for example, by the housing 26, wherein the electrode region 56 is formed in particular by the sub-region 56 of the electrode 32. The electrode region 52 is formed by the electrode 30, in particular by the sub-region 50. The electrode regions 60 and 62 are arranged at a second distance A2 from each other, wherein the distances A1 and A2 run, for example, perpendicular to the longitudinal direction of the pre-chamber spark plug 18 and thus, for example, along the direction illustrated by the double arrow 44. The distances A1 and A2 are greater than zero and different from each other, wherein, for example, the distances A1 and A2 differ from each other within a range of 0.05 millimeters to 0.3 millimeters inclusive, in particular within a range of 0.05 millimeters to 0.15 millimeters inclusive. Furthermore, it is preferably provided that respective tips S, also referred to as electrode tips, of the electrode regions 52, 54, 60 and 62 are formed from metal, in particular from a precious metal. The respective electrodes are designed, for example, as pins, wherein the respective pin is formed, for example, from a metal, in particular a precious metal, or the respective pin is formed, for example, from a metal other than a precious metal and is provide with a precious metal tip.

Because the directions of passage of the openings 22 run at an angle to the longitudinal direction, the openings 22 cause, for example, an at least substantially swirling flow of the mixture flowing from the combustion chamber 12 via the openings 22 and 24 into the pre-chamber 20, as illustrated in the FIGURE by means of an arrow 64, such that favorable ignition conditions can be ensured. The openings 22 are also referred to as tangential, radial holes. In the following, for example, different operating modes or operating states of the internal combustion engine 10 are explained: due to the design of the tangentially position radial holes (openings 22), an at least substantially swirling flow, also referred to as a swirl flow, is formed in the pre-chamber 20, which has the property, on the one hand, of generating a higher flow velocity in the region of the edge 46 of the pre-chamber 20 than in the region of the center M of the pre-chamber 20 and, on the other hand, of concentrating any residual gas or exhaust gas present or remaining in the pre-chamber 20 more in the center M of the pre-chamber 20 around the center electrode (electrode 30 or sub-region 48). Here, it is advantageous, at low loads and/or engine speeds of the internal combustion engine 10, at which a lower flow velocity is also generated in the pre-chamber 20 during the compression phase due to the low pressure in the combustion chamber 12 and thus particularly difficult boundary conditions for an ignition in the spark gap 42 in the region of the center M of the pre-chamber 20 prevail, to place a spark region, in which the mixture is ignited in the pre-chamber 20, at the edge 46 and thus to use the spark gap 40 to ignite the mixture. However, if, for example, at high loads and/or speeds, due to the strong inflow into the pre-chamber 20, also referred to as the chamber, a high turbulence due to the high pressure in the combustion chamber 12 prevails due to the high swirl at the ignition point in the chamber, a particularly high flow velocity in the spark gap 40 in the region of the edge 46 of the chamber can lead to more difficult ignition conditions. In this case, it is advantageous to ignite the mixture in the pre-chamber 20 by means of the spark gap 42 in the region of the center M of the chamber. In order to ensure that the optimum ignition point is selected for the above-mentioned cases, or that the respective ignition spark automatically breaks through between the electrodes at the advantageous location for ignition, the different distances A1 and A2, also referred to as electrode distances, are provided.

Here, it is advantageous if the distance A1 is smaller than the distance A2, which leads to a lower ignition voltage requirement in the spark gap 40 at low loads and speeds or at lower pressure in the combustion chamber 12 and thus, in absolute terms, lower flow velocities in the chamber and thus smaller differences in flow velocity or turbulence between spark gaps 40 and 42. As a result, the breakdown voltage in relation to the spark gaps 40 and 42 is reached first at or in the spark gap 40, such that the ignition spark is formed along the spark gap 40, but not along the spark gap 42.

However, if, at high loads and speeds, high turbulence prevails as a result of the high pressure in the combustion chamber 12 due to the high swirl at the ignition point in the chamber due to the strong inflow of the mixture into the chamber as a result of the high pressure in the combustion chamber 12, a significantly higher ignition voltage requirement for a spark breakthrough is necessary at the spark gap 40 in the region of the edge 46 of the chamber due to a significantly higher flow velocity than in or at the spark gap 42. In this case, due to the lower ignition voltage requirement at or in the spark gap 42, the ignition spark at or in this spark gap 42, which is advantageous for ignition, will jump between the electrodes and thus cause an ignition of the mixture in the chamber.

REFERENCE CHARACTERS 10 internal combustion engine
12 combustion chamber
14 housing element
16 combustion chamber roof
18 pre-chamber spark plug
20 pre-chamber
22 opening
24 opening
26 housing
28 wall
30 electrode
32 electrode
34 insulator
36 dotted line
38 dotted line
40 spark gap
42 spark gap
44 double arrow
46 edge
48 sub-region
50 sub-region
52 electrode region
54 electrode region
56 sub-region
58 sub-region
60 electrode region
62 electrode region
64 arrow
A1 first distance
A2 second distance
S tip
M center

The invention claimed is:

1. A pre-chamber spark plug (18) for a combustion chamber (12) of an internal combustion engine (10), comprising:
a pre-chamber (20) which has a plurality of openings (22, 24) and which is connectable fluidically to the combustion chamber (12) via the openings (22, 24); and
a first spark gap (40) and a second spark gap (42) which are disposed in the pre-chamber (20) and via which respective ignition sparks are formable; wherein:
the first and second spark gaps (40, 42) are arranged asymmetrically distributed in the pre-chamber (20) such that the first spark gap (40) is arranged further outwards with respect to a middle of the pre-chamber spark plug (18) than the second spark gap (42) along a direction (44) extending perpendicularly to a longitudinal direction (36) of the pre-chamber spark plug (18), and the second spark gap (42) is arranged closer to the middle of the pre-chamber spark plug (18) than the first spark gap (40) along the direction (44) extending perpendicularly to the longitudinal direction (36) of the pre-chamber spark plug (18);
a central electrode (30), a ground electrode (32), and a housing (26), wherein the ground electrode (32) is integrally formed with the housing (26) of the pre-chamber spark plug (18) and extends from the housing (26) as an arm (58) toward the central electrode (30) and wherein the second spark gap (42) is formed between a first electrode region (60) formed by the arm (58) and a second electrode region (62) formed by the central electrode (30);

the first spark gap (40) is formed between third and fourth electrode regions (52, 54) and wherein the third and fourth electrode regions (52, 54) have a first distance (A1) from each other and the first and second electrode regions (60, 62) have a second distance (A2) from each other which is different from the first distance (A1);

the first and second distances (A1, A2) differ from one another within a range of 0.05 millimeters to 0.15 millimeters inclusive;

at least respective tips (S) of the electrode regions (52, 54, 60, 62) are formed of a precious metal;

respective passage directions (38) of at least two of the openings (22) run at an angle to the longitudinal direction (36) of the pre-chamber spark plug (18) and to the direction (44) extending perpendicularly to the longitudinal direction (36) of the pre-chamber spark plug (18);

one of the openings (24) is a central opening; and the at least two of the openings (22) are arranged distributed around the central opening in a circumferential direction of the pre-chamber spark plug (18).

2. An internal combustion engine for a motor vehicle, comprising:

a combustion chamber (12); and the pre-chamber spark plug (18) according to claim 1 which is assigned to the combustion chamber.

\* \* \* \* \*